United States Patent [19]

Amdahl et al.

[11] 3,840,727

[45] Oct. 8, 1974

[54] BINARY MULTIPLICATION BY ADDITION WITH NON-OVERLAPPING MULTIPLIER RECORDING

[75] Inventors: Gene M. Amdahl, Saratoga; Michael R. Clements; Lyle C. Topham, both of Santa Clara, all of Calif.

[73] Assignee: Amdahl Corporation, Sunnyvale, Calif.

[22] Filed: Oct. 30, 1972

[21] Appl. No.: 302,226

[52] U.S. Cl. .................................................. 235/164
[51] Int. Cl. .................................................. G06f 7/54
[58] Field of Search .................................... 235/164

[56] References Cited

UNITED STATES PATENTS

| | | | |
|---|---|---|---|
| 3,515,344 | 6/1970 | Goldschmidt et al. | 235/175 |
| 3,691,359 | 9/1972 | Dell et al. | 235/164 |
| 3,761,698 | 9/1973 | Stephenson | 235/164 |

OTHER PUBLICATIONS

C. S. Wallace, "A Suggestion For a Fast Multiplier," IEEE Trans. on Electronic Computers, Feb. 1964, pp. 14–17.

H. Ling, "High-Speed Computer Mult. Using a Multiple-Bit Decoding Algorithm," IEEE Trans. on Electronic Computers, Aug. 1970, pp. 706–709.

*Primary Examiner*—Malcolm A. Morrison
*Assistant Examiner*—David H. Malzahn
*Attorney, Agent, or Firm*—Flehr, Hohbach, Test, Albritton & Herbert; David E. Lovejoy

[57] ABSTRACT

Disclosed is a multiplier method and apparatus for use in a data processing system. The multiplication is carried out in the form $(Ai)\ (b)+C(i-1)=R1\ (i),R2(i)$ where $Ai$ is one byte of a multiplier operand A, $B$ is a multiplicand, $C(i-1)$ is a partial product obtained in a previous step, $R1(i)$ and $R2(i)$ are partial results. The partial results $R1(i)$ and $R2(i)$ are added together to form the partial product $C(i)$. The product of $Ai$ and $B$ summed with the partial products $C(i-1)$ is executed by recoding the operand $Ai$. Typically, for 8-bit bytes, an 8-to-5 recoding is performed. The 5-bit code thus derived is employed to form five partial sums of the operand B. The five partial sums together with the partial product $C(i-1)$ are input to a multiple input carry-save adder where they are simultaneously added to form the partial results $R1(i)$ and $R2(i)$. Thereafter the partial results $R1(i)$ and $R(i)$ are added in an external adder to form the partial product $Ci$. The final product P, where $P=(A)\ (B)$, is formed from the partial products $Ci$ where $i=1, 2, 3, 4$.

9 Claims, 7 Drawing Figures

217
II
-a6
-a7
+a7
+a6
BITS 6,7
-k1(-1)
-k1(-2)
-k1(+1)
-k1(0)
244
+a4
-a6
-a4
+a5
+a6
-a5
BITS 4,5,6
-k2(0)
-k2(+1)
-k2(-2)
-k2(+2)
-k2(-1)
245
+a2
-a4
-a2
+a3
+a4
-a3
BITS 2,3,4
-k3(0)
-k3(+1)
-k3(-2)
-k3(+2)
-k3(-1)
245
+a0
-a2
-a0
+a1
+a2
-a1
BITS 0,1,2
-k4(0)
-k4(+1)
-k4(-2)
-k4(+2)
-k4(-1)
245
246
+a0
+NBQ
-SIER
-a0
+SIER
BIT 0
-k5(+1)
-k5(0)
RECODER

217
II
248
-a6
-a7
+a7
+a6
-k1(-1)
-k1(-2)
-k1(+1)
-k1(0)
BITS 6,7
244
+a4
-a6
-a4
+a5
+a6
-a5
-k2(0)
-k2(+1)
-k2(-2)
-k2(+2)
-k2(-1)
BITS 4,5,6
245
246
+a0
+NBQ
-SIER
-a0
+SIER
-k5(+1)
-k5(0)
BIT 0

BINARY MULTIPLICATION BY ADDITION WITH NON-OVERLAPPING MULTIPLIER RECORDING

CROSS REFERENCE TO RELATED APPLICATIONS

1. DATA PROCESSING SYSTEM, Ser. No. 302,221, filed Oct. 30, 1972, invented by Gene M. Amdahl et al, and assigned to Amdahl Corporation.

2. ADDER AND DATA PROCESSING SYSTEM INCLUDING REDUNDANCY TERMS, Ser. No. 302,228, filed Oct. 30, 1972, now U.S. Pat. No. 3,805,045 invented by Dee E. Larsen, and assigned to Amdahl Corporation.

BACKGROUND OF THE INVENTION

The present invention relates to the field of data processing systems and specifically to the field of high-speed multiplication methods and apparatus within data processing systems.

In data processing systems, the speed of multiplication and the number of circuits required to carry out the multiplication are important considerations which relate to the cost and performance of the system.

In some systems, no special apparatus is provided for carrying out multiplication operations and therefore the multiplication is performed by executing algorithms which control adders within the systems. While such systems are economical in that they require no special multiplication apparatus, they also do not achieve a high degree of performance because of the relatively long amount of time required to execute multiply instructions.

In those systems which employ special apparatus for carrying out multiplication of operands, the number of logic circuits required to perform the multiplication has been generally greater than desired. For a data processing system which processes a byte of data at a time, it is generally desirable that the multiplier be capable of providing one byte of data for each cycle of the data processing system in order not to degrade system performance. Further, it is desired that the number of circuits for carrying out the multiplication be a minimum in order to reduce the cost of the data processing system.

High-speed multiplier designs have relied upon multiple input adders, such as carry-save adders, for simultaneously adding a plurality of partial sums in order to speed up the multiplication operation.

While the use of multiple input adders can improve the speed with which multiplications can be carried out, the number of circuits and therefore the cost of such increases can be excessive. In order to insure that the number of inputs required by the multiple-input-adders is suitable for the number code of the numbers to be added, the inputs operands frequently must be recoded.

The multiplication method and apparatus must also retain identification of the multiplication sign, optimize the time for performing the multiplication operation and minimize the number of logic circuits employed for the size operands processed.

SUMMARY OF THE INVENTION

The present invention is a multiplication method and apparatus for executing the function $(Ai)\ (B) + C(i-1) = R1(i), R2(i)$. The multiplier bytes $(Ai)$ of the operand A are recoded and used to form partial sums of the operand B and those partial sums are added simultaneously with the partial product $C(i-1)$ in a multiple input adder. The multiple input adder produces the partial results $R1(i)$ and $R2(i)$ which together are added in an external adder to form the partial product $C(i)$ as given by $R1(i) + R2(i) = C(i)$.

In one embodiment of the present invention, the bytes $(Ai)$ of operand A are 8-bits, operand B is 4 bytes or 32-bits and the partial product $(Ci)$ are 5 bytes or 40-bits. The recoding of the bytes $(Ai)$ is from 8-to-5 so that five partial sums of operand B are formed and serve as five inputs to a six-input carry-save adder. The partial product $C(i-1)$ serves as the other input to the carry-save adder. The final product $P$, where $P=(A)(B)$ is obtained a byte at a time from the low order 8-bits of the first three partial products $Ci$. Specifically, $P$ equals P1, P2, P3, P4, . . . ,P8 P1 is the low order 8-bits of C1, P2 is derived from the sum of the low order 8-bits of C2 and a hyte C1( 4), and P3 is derived from the sum of the low order 8-bits of C3 and a byte C2(4). The bytes P4, P5, . . . , P 8 of P are equal to the sum of the 40-bit partial product C4 and the high-order bytes C3(4), C3(3), C3(2) and C3(1) of partial product C3.

The present invention includes means for keeping track of the sign of the multiplication when signed multipliers are employed.

In accordance with the above summary, the present invention achieves the object of performing multiplications using the recoded output of a multiplier to form partial sums which are added together simultaneously with a partial product in a multiple input adder.

Additional objects and features of the invention will appear from the following description in which the preferred embodiments of the invention have been set forth in detail in conjunction with the drawings.

DESCRIPTION OF THE PREFERRED EMBODIMENTS

Overall System

Figure 1:
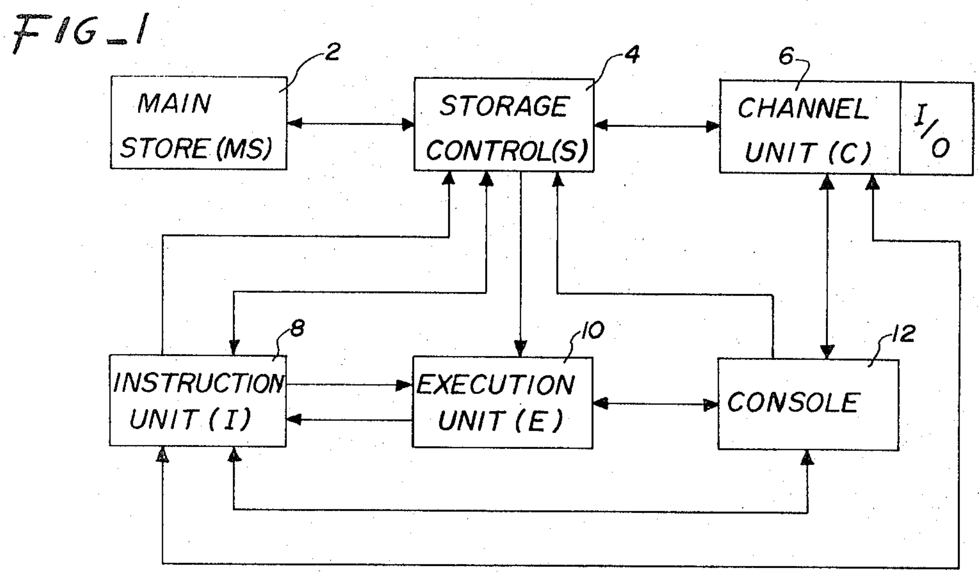
FIG. 1 depicts a block diagram of a basic environmental system suitable for employing the multiplication method and apparatus of the present invention.

In FIG. 1, a basic environmental data processing system which is suitable for employing the multiplication method and apparatus of the present invention. Briefly, that system includes a main store 2, a storage control unit 4, an instruction unit 8, an execution unit 10, a channel unit 6 with associated I/O and a console 12. In accordance with well known principles, the data processing system of FIG. 1 operates under control of a stored program of instructions. Typically, instructions and the data upon which the instructions operate are introduced from the I/O equipment via the channel unit 6 through the storage control unit 4 into the main store 2. From the main store 2, instructions are fetched by the instruction unit 8 through the storage control 4, and are decoded so as to control the program execution within the execution unit 10. Execution unit 10 executes instructions decoded in the instruction unit 8 and operates upon data communicated to the execution unit from the appropriate places in the system. By way of general background and for specific details relating to the operation of the basic environmental system of FIG. 1, reference is made to the above identified application DATA PROCESSING SYSTEM, Ser. No. 302,221, filed Oct. 30, 1972.

Execution Unit

Figure 3:
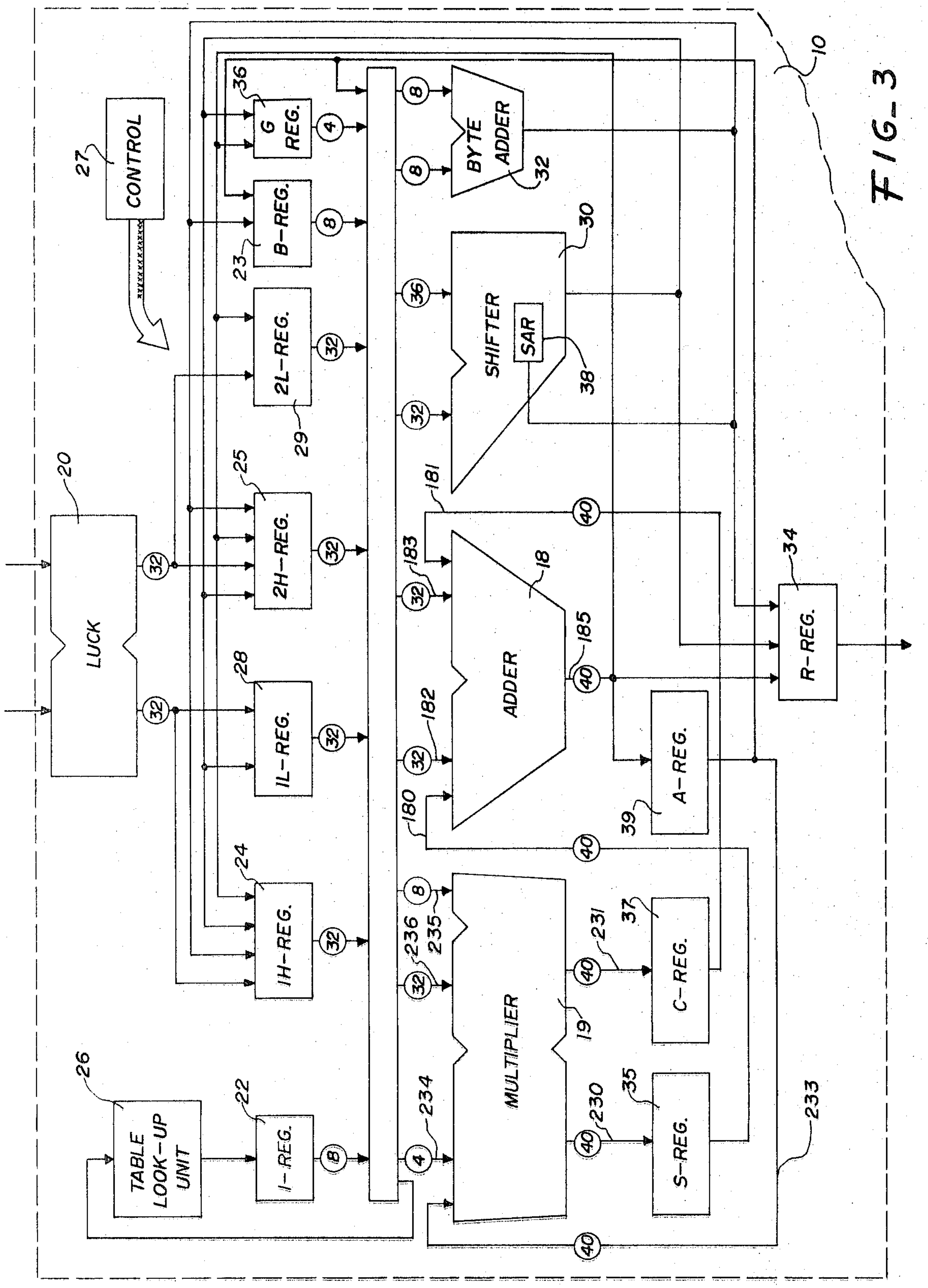
FIG. 3 depicts a block diagram showing the data paths and associated apparatus relating to the multiplier of FIG. 2 and relating to the other functional units within the execution unit of FIG. 1.

In FIG. 3, the execution unit 10 of FIG. 1 includes a logical and checking apparatus identified as LUCK unit 20, a multiplier 19, an adder 18, a shifter 30, and a byte adder 32. The input data to the E-unit from the data processing system of FIG. 1, passes through the LUCK unit 20. After manipulation, the result is stored in the R register 34 from which information is returned to the data processing system of FIG. 1. The storing and gating of information is under control of a control unit 27 in cooperation with a plurality of registers. The registers include the 8-bit I register 22, the 32-bit 1H register 24, the 32-bit 1L register 28, the 32-bit 2H register 25, the 32-bit 2L register 29, the 8-bit B register 23, the 4-bit G register 36, the 40-bit S register 35, the 40-bit C register 37, the 40-bit A register 39 and the 32-bit R register 34. Also, the execution unit includes the table look-up unit 26 used in connection with the divide algorithm performed by the data processing system of FIG. 1.

The execution unit of FIG. 3 performs a multiplication of an operand A and an operand B to form the product P. Typically, the operand A is a 32-bit multiplier and the operand B is a 32-bit multiplicand. Operand A is stored in the 2L register 29 where it includes the four bytes *Ai* which are specifically A1, A2, A3 and A4, organized from low order to high order. Operand B is also typically 32-bits and is stored in the 1L or 1H registers 28 or 24. The low order first of the *Ai* bytes, A1, is transferred from the 2L register 29 to the I register 22. To begin processing, the A1 byte from I register 22 is gated via bus 235 and the operand B is gated from the 1H or 1L register via bus 236 into the multiplier 19. For the initial byte ($i$=1), the input on bus 233 is 0.

Multiplier 19 forms as outputs an R1(1) partial result on bus 231 which is stored in the C register 37 and an R2(1) partial result on bus 230 which is stored in the S register 35. Those partial results R1(1) and R2(1) are gated into the adder 18 via buses 181 and 180, respectively where they are added to form the first partial product C1 of four partial products C*i*. Simultaneously with gating the partial results R1(1) and R2(1) into the adder 18, the second multiplier byte A2 is gated along with the operand B into the multiplier 19 so that the second partial results R1(2) and R2(2) are formed at the same time that the partial product C1 is formed and stored in the A register 39.

The low order byte C1(5) of the partial product C1 is transferred to the R register 34. The next higher order byte C1(4) of partial product C1 is transferred to the B register 23 for storage. The three high order bytes C1(3), C1(2) and C1(1) of the partial product C1 are gated via bus 233 as an input to the multiplier 19, where they are added to the product of operand B and multiplier byte A3. The product of A3 and B summed with the three bytes C1(3), C1(2) and C1(1) forms the new partial results, R1(3) and R2(3). At the same time R1(3) and R2(3) are formed R1(2) and R2(2) are added in the adder 18 to form the new partial product C2.

The partial product C2 has its three high order bytes C2(3), C2(2) and C2(1) gated as partial product inputs via bus 233 for addition to the product of operand B and the multiplier byte A4 to form the partial results R1(4) and R2(4). Simultaneously therewith, the partial results R1(3) and R2(3) are gated into and added in adder 18 to form the new partial product C3. Simultaneously therewith, the byte C1(4), stored in the B register 23, is added to the partial product byte C2(5) in the byte adder 32 to form the second product byte P2 of the final product P while the byte C2(4) is placed in the B register 23 for future use.

Next, the partial results R1(4) and R2(4) are added in the adder 18 to form the new partial product C4. Simultaneously the byte C2(4) from the B register 23 is added to the byte C3(5) from the A register 39 in the byte adder 32 to form the third byte P3 of the final product P while bytes C3(1 through C3(4) are moved through the multiplier 19 to the S register 35. Finally, the five-byte partial product C4 from the A register 39 is added in adder 18 to the four bytes C3(1) through C3(4) from the S register 35 to form the five high order bytes P4, P5, . . . , P8 of the final product P which are stored in the A register 39. Additionally in one embodiment, four of the five high-order bytes are stored in the R register 34 at the same time they are stored in the A register 39. The remaining fifth high-order byte is thereafter gated into the R register 34 from the A register 39 via the byte adder 32 without alteration in the byte adder. The low order bytes P1, P2, P3 of the final product P are derived as previously indicated, from the partial products C1, C2, and C3.

MULTIPLIER

Figure 2:
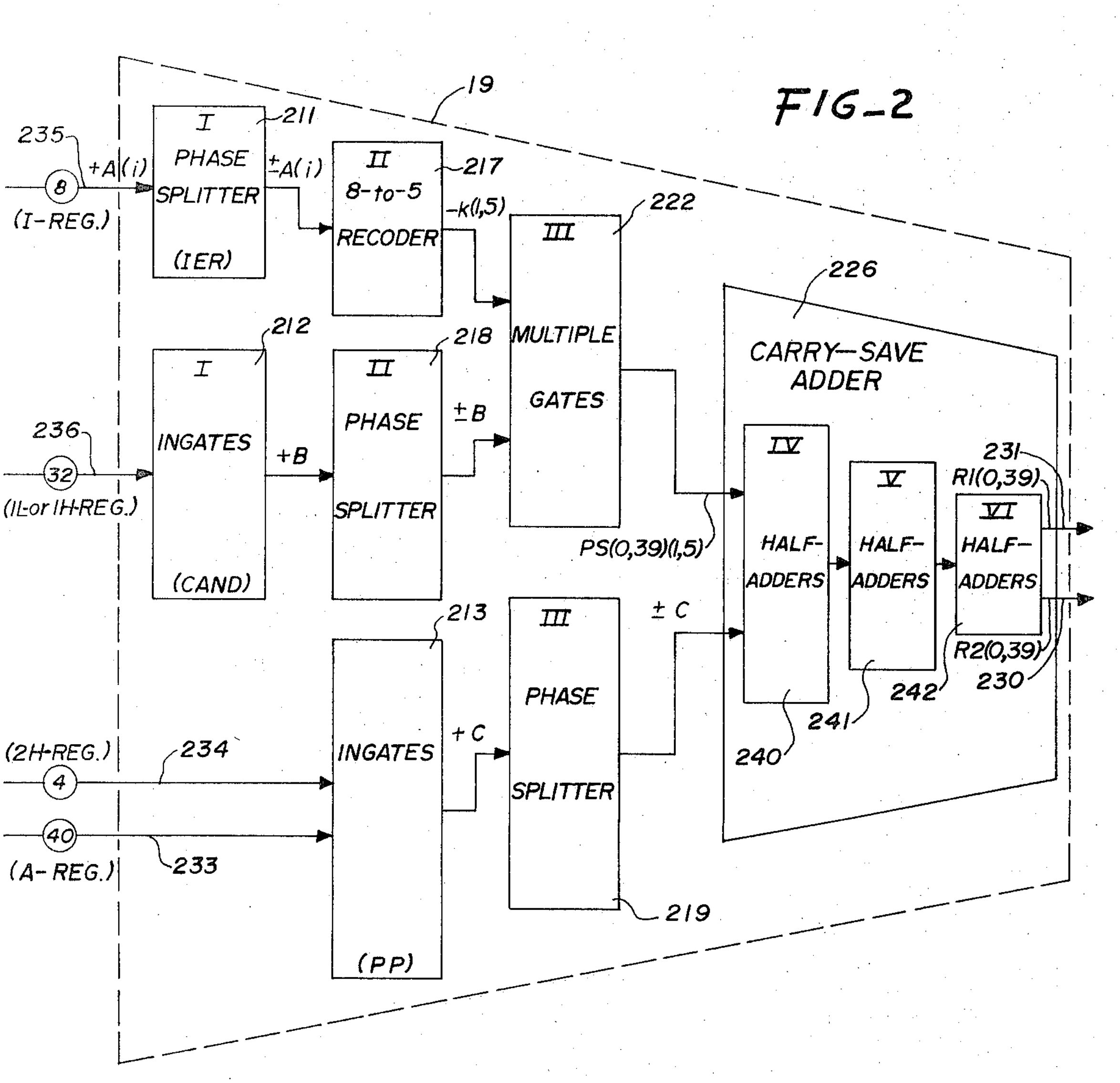
FIG. 2 depicts a block diagram of the multiplier apparatus employed within the execution unit of the system of FIG. 1.

In FIG. 2, the multiplier 19 of FIG. 3 is shown including six logic levels I through VI. Level I includes the phase splitter 211 which functions in a conventional manner to form the + and − phases of the +A*i* byte of operand A gated from the I register 22 in the execution unit 10 of FIG. 3 to provide the ±A*i* inputs to the 8-to-5 recorder 217 in level II. The phase splitter 211 in level I as well as the phase splitter 218 and 219 in levels II and III are well known devices for forming double polarity signals (±) from a single polarity signal (+).

The ingates in level I function, in a well known manner, to provide the input operand +B to the phase splitter 218 in level II. Typically, the ingates 212 select the contents of the 1H register 24 to provide an input to the multiplier 19 via bus 236.

The ingates 213 in level II similarly selects the input operand +C to provide an input to the phase splitter 219 of level III via bus 233. The ingates 212 and 213 are well known devices which operate under control of control signals from control unit 27 in FIG. 3.

The 8-to-5 recoder 217 in level II functions to convert the input data bits of the operand A bytes +A$i$ to five recoded output signals $-k(1,5)$. Specifically, each operand A byte ±A$i$ includes the bits $\pm a0$, $\pm a1$, . . . , $\pm a7$. The ±A$i$ inputs to the recoder 217 produces the $-k(1,5)$ outputs which consist of $-k(1)$, $-k(2)$, . . . , $-k(5)$. Those $-k(1,5)$ outputs serve as inputs to the multiple gates 222 in level III.

The phase splitter 218 in level II receives the +B input which consists of bits $+b0$, $+b1$, . . . , $+b31$ which are single polarity. The phase plitter 218 functions to convert the single polarity operand B to a double polarity operand ±B which consists of the bits $\pm b0$, $\pm b1$, . . . , $\pm b31$, which are input to the multiple gates 222 in level III.

The multiple gates 222 in level III function to form five partial products, one each for each of the five recoder inputs $-k(1,5)$. Each bit position $n$ where $n$ is from 0 to 39 includes five outputs 1 through 5. For bit position 0, therefore, the multiple gates produce the outputs PS(0)(1), PS(0)(2), . . . , PS(0)(5). Similarly, for $n$ equal to 1 the multiple gates produce the output PS(1)(1), PS(1)(2), . . . , PS(1)(5). For all 40 bits (8 bits of A and 32 bits of B) 40 groups of five signals per group are produced as indicated by the signals PS(0,39)(1,5). Those signals output from the multiple gates 222 serve as the inputs along with the 40-bits of the ±C operand to the carry-save adder 226 in levels IV, V and VI.

The ±C operand includes the bits ±C0, ±C1, . . . , ±C39. Those ± signals are derived from the phase splitter 219 in level III, which in turn generates the positive and negative phases from the positive phase input +C.

The carry-save adder 226 includes three groups of half-adders 240, 241 and 242 in levels IV, V, VI, respectively. The carry-save adder 226 functions to sum for each bit the five signals associated with the multiple gates inputs PS(0,39)(1,5) with a single bit from the ±C operand. Each bit of the half-adders 240 includes, therefore, five inputs from the multiple gates and one input from the operand C. Those six inputs are reduced to the two outputs R1(0,39) and R2(0,39) on lines 231 and 230, respectively.

MULTIPLIER 8-to-5 RECODER

Figure 4:
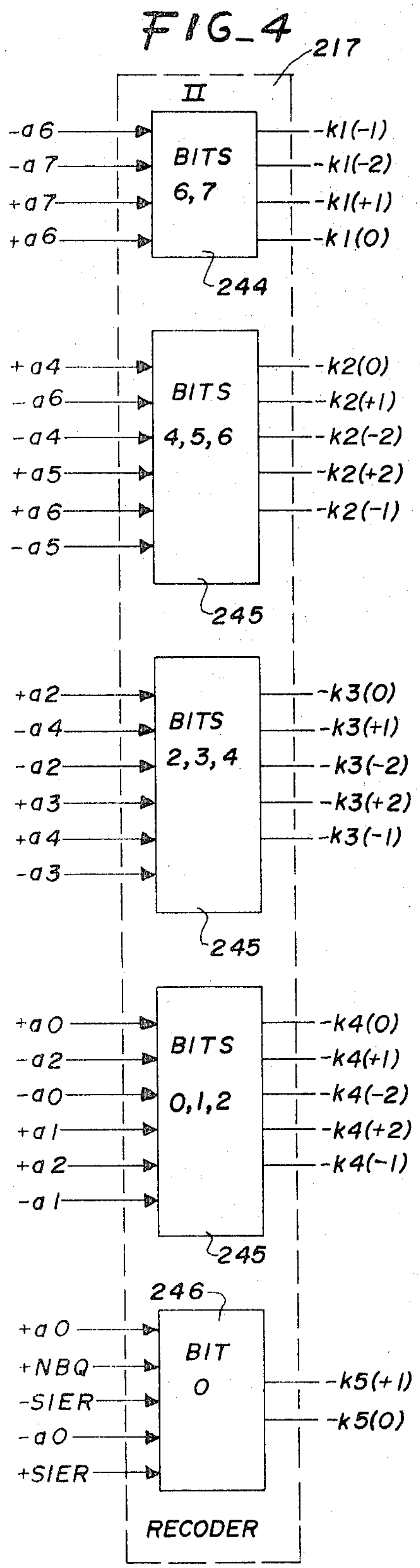
FIG. 4 depicts a schematic representation of the 8-to-5 recoder in the second level of logic of the multiplier of FIG. 2.

In FIG. 4, the 8-to-5 recoder 217 of the multiplier of FIG. 2 is shown consisting of the logic blocks, 244, 245 and 246. Logic block 244 is used with BITS 6 and 7, logic block 245 is used with BITS 4, 5, 6, with BITS 2, 3, 4 and with BITS 0, 1, 2. Logic block 46 is used with BIT 0. In FIG. 4, the inputs to the logic blocks 244, 245 and 246 are shown for 8-bits of each byte A$i$ of operand A. Specifically, the inputs are $\pm a0$, $\pm a1$, . . . , $\pm a7$. When the second byte of A2 of operand A is being processed by the multiplier 19 of FIG. 2, then the inputs in FIG. 4 are $\pm a8$, $\pm a9$, . . . , $\pm a15$ which map identically to $\pm a0$, $\pm a1$, . . . , $\pm a7$.

Additionally, the BIT 0, logic circuit 246 includes an input +NBQ which is a signal employed when a 9-bit quotient is processed in connection with the divide algorithm carried out by the execution unit 10 of the data processing system of FIG. 1. Similarly, the signal +SIER is employed in connection with signed multiplier processing of the present invention.

The function of the 8-to-5 recoder is to recode the weighted inputs $a0$ through $a7$ to the weighted outputs $k1$ through $k5$. The inputs $a0$, $a1$, . . . , $a7$ are weighted $2^8$, $2^7$, . . . , $2^0$, respectively. The weighted outputs $k1$, $k2$, . . . , $k5$ are weighted $2^0$, $2^2$, . . . , $2^8$, respectively. Furthermore, each of the outputs $k1$ through $k5$ is coded with the five decimal weights of 0, ±1, ±2. Accordingly, the five $k2$ outputs $k2(0)$, $k2(+1)$, $k2(-1)$, $k2(+2)$ and $k2(-2)$ represent the values 0, $+1\times2^2$, $-1\times2^2$, $+2\times2^2$, and $-2\times2^2$. Similarly, the five $k3$ outputs $k3(0)$, $k3(+1)$, $k3(-1)$, $k3(+2)$, $k3(-2)$ represent the values 0, $+1\times2^4$, $-1\times2^4$, $+2\times2^4$, $-2\times2^4$, respectively. Similarly, the $k4$ outputs represent the five values 0, ±1 and +2 times $2^6$ and the $k5$ outputs represent the values times $2^8$. Only the two values $k5(+1)$ and $k5(0)$ are required for the $2^8$ multiplication. Similarly, only the four values $k1(0)$, $k1(+1)$, $k1(-1)$ and $k1(-2)$ are required for the $2^0$ multiplication.

Figure 5:
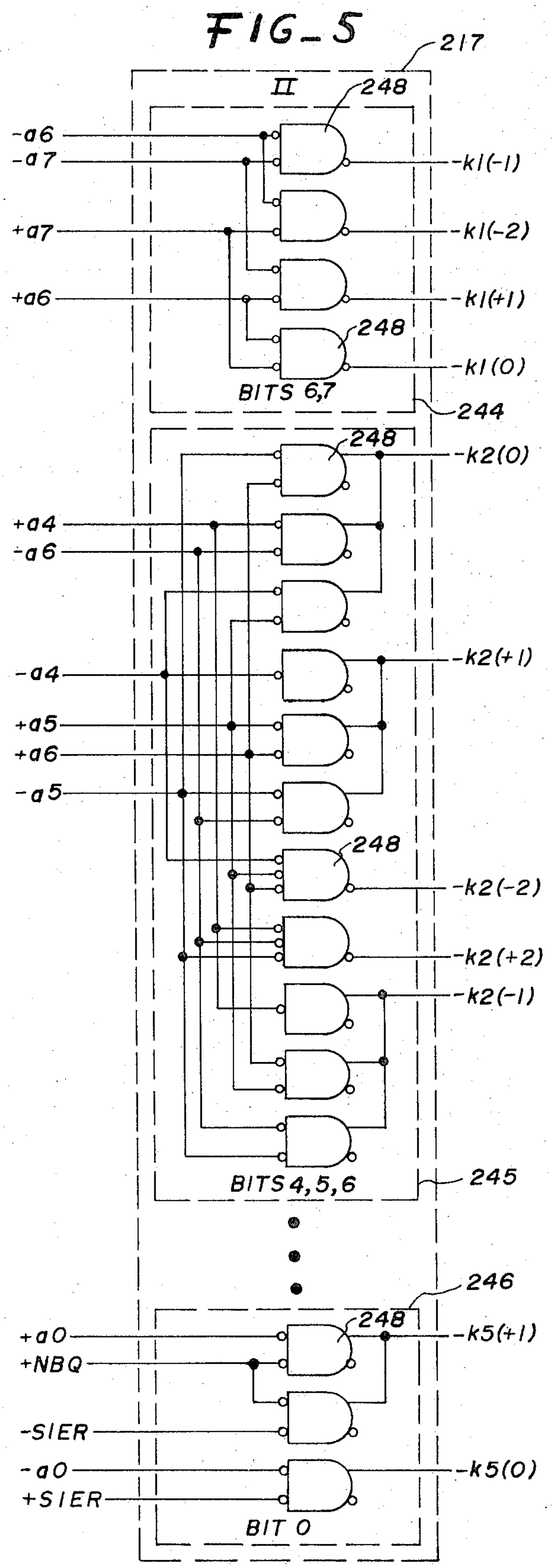
FIG. 5 depicts a further detailed representation of the recoder of FIG. 4.

In FIG. 5, the logic circuits 244, 245 and 246 for producing the $k1$ through $k5$ outputs of the 8-to-5 recoder of FIG. 4 are shown in further detail. Specifically, logic block 244 consists of four NOR/OR gates 248. The logic block 48 recodes the two low order bits $\pm a6$ and $\pm a7$ into the signals $-k1(-1)$, $-k1(-2)$, $-k1(+1)$, and $-k1(0)$.

The logic block 245 in FIG. 5 consists of 11 NOR/OR gates 248 which recode the input bits $\pm a4$, $\pm a5$ and $\pm a6$ into the control outputs $-k2(0)$, $-k2(+1)$, $-k2(-2)$, $-k2(+2)$, and $-k2(-1)$.

In FIG. 5, the BITS 4, 5, 6 circuitry is shown as typical for logic block 245. The logic block 245 is also employed for BITS 2, 3, 4 and BITS 1, 2, 3 in a manner identical to that for BITS 4, 5, 6.

The logic block 246 consists of three NOR/OR gates 248 which produce the $-k5(+1)$ and $-k5(0)$ control signals from the $\pm a0$ input bit. Whenever 9-bit bytes are processed, in connection with extended accuracy desired in the divide algorithm, the +NBQ line is energized. The +SIER lines are employed in maintaining the value of the sign of the multiplier A of the present invention when signed multiplication is being performed. For a positive multiplier +SIER is a logical 1 and −SIER is a logical 0.

MULTIPLIER MULTIPLE GATES

Figure 6:
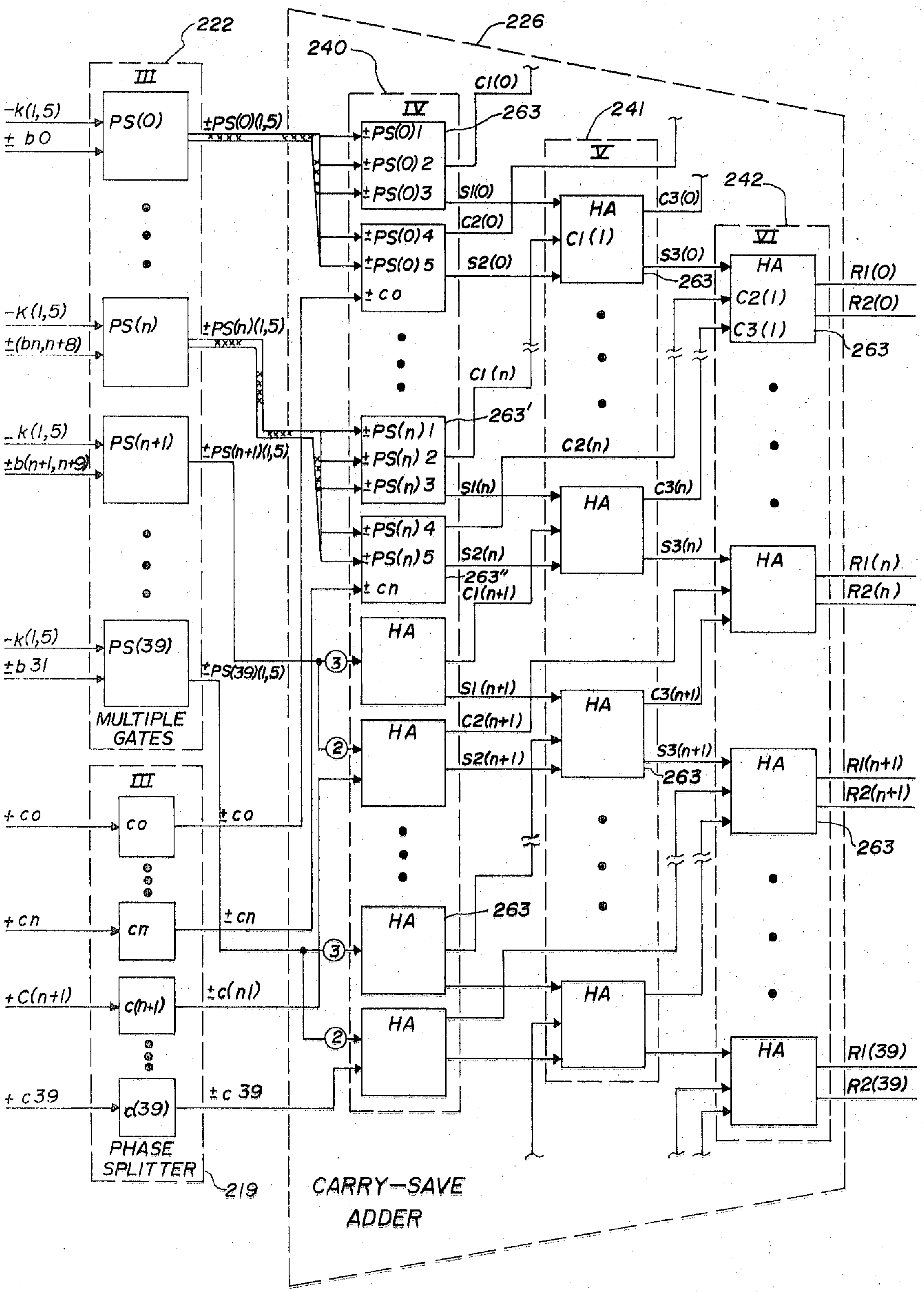
FIG. 6 depicts a schematic representation of the multiple gates and phase splitter within level III and the carry-save adder within the levels IV, V, and VI of the multiplier of FIG. 2.

In FIG. 6, 40 multiple gates PS(0) through PS(39) are responsive to the recoded control signals $k(1,5)$ to form five partial sums of the multiplicand operand B. The five partial sums correspond to the five control signals $k(1,5)$ derived from the 8-to-5 recoder of FIGS. 4 and 5.

For the control signal $k1$, operand B is gated through directly without shifting, representing multiplication by a value of $2^0$, while also being multiplied by one of the four factors, 0, ±1, −2 thereby forming the first partial sum PS1. For the control signal $k2$, the operand B is shifted right-to-left, from low order to high order, by two bits, representing multiplication by $2^2$, while also being multiplied by one of the five factors 0, ±1, or ±2, thereby forming the partial sum PS2. For the control signal $k3$, the operand B is shifted from low order to high order four bits, representing multiplication by $2^4$, while also being multiplied by one of the five factors 0, ±1, ±2 to form the partial sum PS3. For the control signal $k4$, the operand B is shifted from low order to high order six bits, representing multiplication by $2^6$, while also being multiplied by one of the five factors, 0, ±1, ±2 to form the partial sum PS4. For the control signal k5, the operand B is shifted from low order to high order eight bits, representing multiplication by $2^8$, while being multiplied by one of the factors 0 or +1 to form the partial sum PS5.

Multiplication by one of the five factors, 0, ±1, or ±2 is carried out in the following manner. For multiplication by 0, all of the bits of operand B are set to 0 within the multiple gates 222. For multiplication by +1 the operand B is gated through directly by the multiple gates 222 with only the shifts indicated in the previous paragraph. For multiplication by −1, the operand B is complemented and a carry-in is propagated into the low order bit position in addition to any of the shifts indicated in the previous paragraph. For multiplication by +2, the operand B is shifted one bit from low order to high order in addition to any shift indicated in the previous paragraph. For multiplication by −2, operand B is complemented and shifted one bit in addition to any shift indicated in the previous paragraph and a carry-in is inserted in the lowest order position.

The multiple gate PS(0) receives the five control inputs *k*(1,5) and the operand B bit ±*b*0. The circuit PS(1) has as inputs the control lines −*k*(1,5) and the input bits ±*b*0 and ±*b*1. The circuit PS(2) includes the inputs −*k*(1,5) and the input bits ±*b*0, ±*b*1, and, ±*b*2. In a similar manner, the circuits up to PS(7) each include the control inputs −*k*(1,5) and an increasing number of bit inputs until the bit inputs are ±*b*0, ±*b*1, . . . , ±*b*7. Thereafter, each partial sum PS(*n*) includes the control inputs −*k*(1,5) and the group of eight bits ±(*bn*, *n*+8) which include the bit inputs ±*bn*, ±*b*(*n*+1), ±*b*(*n*+2), . . . , ±*b*(*n*+8). Each of the PS(*n*) circuits for *n* equal to 8 through 32 includes the eight bit inputs. The circuits for *n* equal to 33 through 39 have a decreasing number of bit inputs. For example, the circuit PS(33) includes as inputs the control signals −*k*( 1,5) and the seven input bits ±*b*25, ±*b*26, . . . , ±*b*31. The circuit PS(34) has the control inputs −*k*(1,5) and the six input bits ±*b*26, ±*b*27, . . . , ±*b*31.

Each multiple gate PS(*n*) for *n* equal 0 to 39 produces the five output signals indicated as +PS(*n*)(1,5). Those five signals are input to one stage of the carry-save adder 226 where they are added together with the corresponding partial product bit ±*cn*.

Figure 7:
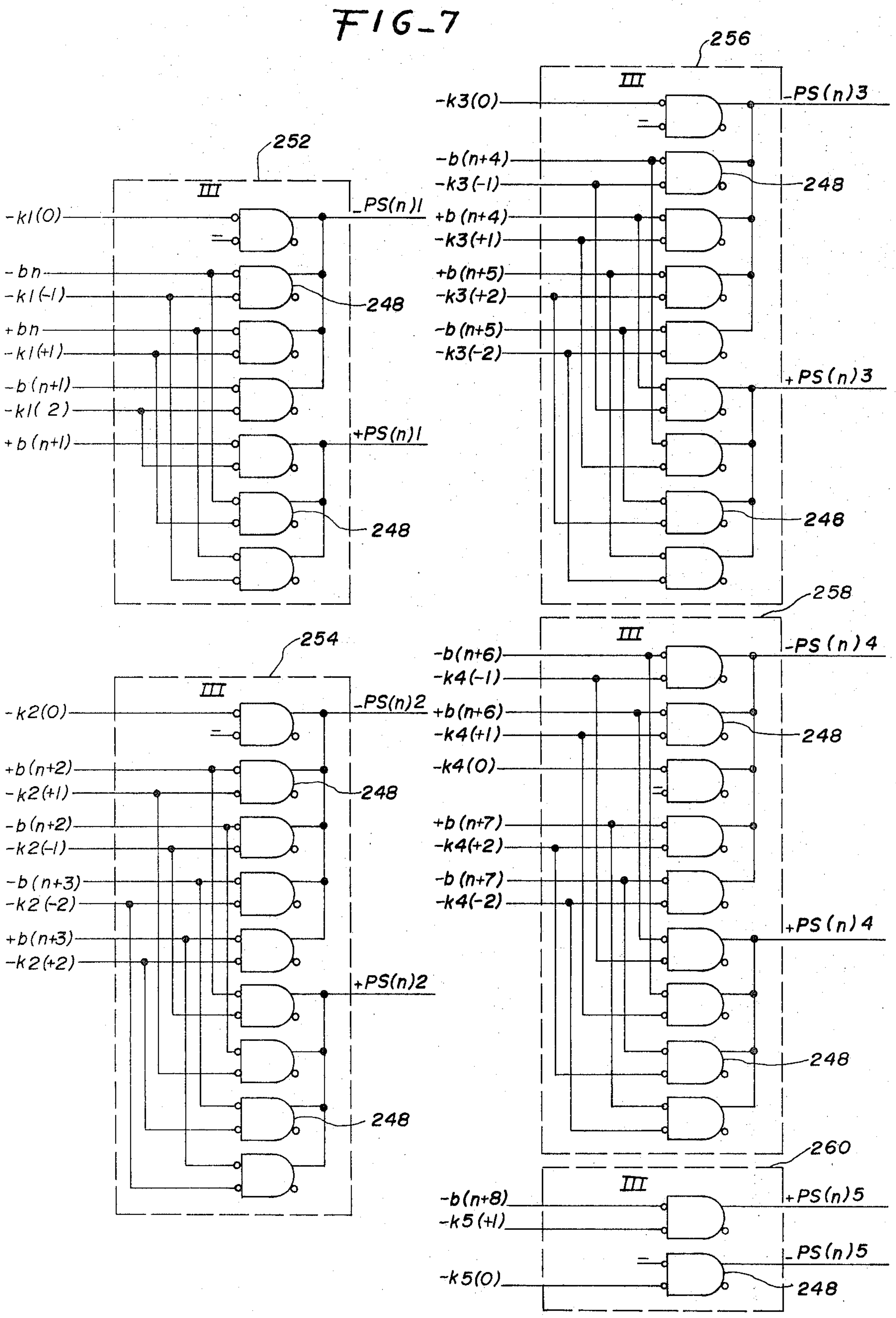
FIG. 7 depicts a schematic representation of the level III multiple gates of FIG. 6 and of FIG. 2.

In FIG. 7, the multiple gates 222 of FIG. 6 are shown in further detail for a typical multiple gate PS(*n*). The five outputs ±PS(*n*)(1,5) include the outputs ±PS(*n*)1, ±PS(*n*)2, . . . , ±PS(*n*)5. The ±PS(*n*)1 signals are derived for a logic circuit 252 which includes seven NOR-/OR gates 248 which logically combine the control signals −*k*1(0), −*k*1(−1), −*k*1(+1), −*k*1(−2), with the bit signals −*bn*, +*bn*, −*b*(*n*+1) and +*b*(*n*+1).

The ±PS(*n*)2 signals are derived from a logic circuit 254 which includes nine NOR/OR gates 248 which logically combine the control signals −*k*2(0), −*k*2(+1), −*k*2(−1), −*k*2(−2) and −*k*2(+2), with the data bits +*b*(*n*+2), −*b*(*n*+2), −*b*(*n*+3) and +*b*(*n*+3).

The ±PS(*n*)3 signals are generated by a logic circuit 256 which includes nine NOR/OR gates 248 which logically combine the control signals −*k*3(0), −*k*3(−1), −*k*3(+1), −*k*3(+2) and −*k*3(−2) with the data bits −*b*(*n*+4), +*b*(*n*+4), +*b*(*n*+5), −*b*(*n*+5).

The ±PS(*n*)4 signals are generated by a logic circuit 258 which includes nine NOR/OR gates 248 for logically combining the control signals −*k*4(−1), −*k*4(+1), −*k*4(0), −*k*4(+2) and −*k*4(−2) with the data bits −*b*(*n*+6), +*b*(*n*+6), +*b*(*n*+7), −*b*(*n*+7).

The ±PS(*n*)5 signals are generated by a logic circuit 260 which includes two NOR/OR gates 248 for logically combining the control signals −*k*5(+1), −*k*5(0) with the data bit −*b*(*n*+8).

MULTIPLIER CARRY-SAVE ADDER

In FIG. 6, the multiple gates 222 provide the inputs ±PS(0,39), (1,5) to the level IV half-adder logic block 240. Also, the phase splitter 219 provides the inputs ±C to the level IV half-adder logic block 240. More specifically, the multiple gate PS(0) provides the three inputs ±PS(0)1, ±PS(0)2, ±PS(0)3 to one half-adder and provides the inputs ±PS(0)4 and ±PS(0)5 to the other half-adder associated with the 0 bit of the carry-save adder 226. The half-adder receiving the ±PS(0)(4,5) inputs also receives as its third input ±*co* bit from the *co* stage of the phase splitter 219.

In a similar manner, each $n^{th}$ bit of the carry-save adder 226 has two input half-adders 263′ and 263″. The half-adder 263′ receives the three inputs ±PS(*n*)(1,3) and the half-adder 263″ receives the two inputs ±PS(*n*)(4,5) along with the data bit input ±*cn* from the $cn^{th}$ stage of the phase splitter 219.

The two half-adders 263′ and 263″ are typical of all the half-adders in the half-adder block 240. The half-adder 263′ produces from its three inputs a sum output S1(*n*) which functions as one input to the half-adder 263 representing the $n^{th}$ bit of the carry-save adder 226 in the level V logic block 241. Also, the half-adder 263′ in the level IV logic produces the carry output C1(*n*) which serves as one input to a half-adder in the level V logic corresponding to the bit (*n*−1) of the carry-save adder 226. The other $n^{th}$ bit half-adder 263″ similarly produces a sum output S2(*n*) which serves as a second input to the half-adder 263 in the level V $n^{th}$ bit logic as well as a carry output C2(*n*) which serves as an input to the half-adder 263 in the level VI logic corresponding to the $(n-1)^{th}$ bit.

The level V half-adder 263 for the *n*th bit receives the carry C1(*n*+1) and the sum inputs S1(*n*) and S2(*n*) from the IV level to produce the carry output C3(*n*) and the sum output S3(*n*).

The level VI half-adder 263 receives the sum output S3(*n*) and the carry outputs C2(*n*+1) and C3(*n*+1) and forms as outputs the sum signal R2(*n*) and the carry output R1(*n*).

In a manner analogous to that described for the *n*th bit each of the logic levels IV, V and VI includes corresponding logic blocks and signals for forming the output signals R1(0), R1(1), . . . , R1(39) and the signals R2(0), R2(1), . . . , R2(39). Those R1(0,39) signals and R2(0,39) signals represent two partial 40-bit results which are respectively gated into the S register 35 and the C register 37. From the registers 35 and 37 those partial results R1 and R2 are gated into adder 18 of FIG. 3 where they are summed and placed in the A register 39 in the form of a partial product C. The partial product C is gated from the A register 39 via bus 233 as an input to the multiplier 19 by the ingates 213.

The +C partial product is gated through the phase splitter 219 to form the dual phase outputs ±C. From the phase splitter 219 the partial product ±C serves as an input to the carry-save adder 226 in the manner previously described.

MULTIPLIER OPERATION

The operation of the multiplier and multiplication method of the present invention is described with a multiplier A equal to decimal +100 and a multiplicand equal to decimal +50.

The binary representation of the multiplier A is 01100100 for the low order byte A1 and all 0's for the higher order bytes A2, A3 and A4. The binary representation of the multiplicand B is all 0's for the higher bytes B2, B3 and B4 and 00110010 for the low order byte B1. The recoding of the multiplier bits 01100100 in the binary code to the 0, ±1, ±2 code $k(1,5)$ is 0, +1, −2, +2 and 0 for $k1$, $k2$, $k3$, $k$ 4, and $k5$, respectively.

In FIG. 2, the 8-bit multiplier A1 is gated via bus 235 to the phase splitter 211 to provide an input to the 8-to-5 recoder 217 having both positive and negative phases. In FIG. 4 and FIG. 5, the bits 01100100 correspond to $a0$, $a1$, . . . , $a7$, respectively.

In FIG. 2, the input bits 00110010 of operand B correspond to bits $b24$, $b25$, . . . , $b31$, respectively, of byte B1. Bits $b0$, $b1$, . . . , $b23$ corresponding to bytes B2, B3 and B4 are all 0's.

In recoder 217 of FIGS. 4 and 5, the logic block 244 detects the 1 or 0 state of the bits $a6$ and $a7$ so as to energize only the $-k1(0)$ output line.

In FIG. 5, the input bits $+a6$ and $+a7$ are 0's and therefore the input bits $-a6$ and $-a7$ are 1's. The logic block 244 produces a 0 for the $-k1(0)$ output and a 1 for the other outputs $-k1(+1)$, $-k1(-2)$ and $-k1(-1)$. The 0 energization of $-k1(0)$ signifies that the $2^0$ term is multiplied by 0.

In FIG. 5, the logic block 245 receives input bits $+a4$, $+a5$ and $+a6$ which have the values 0, 1, 0, respectively, so that the inputs $+a4$, $-a5$, and $-a6$ are 1, 0, 1, respectively. With these inputs, the logic block 245 produces a 0 for the $-k2(+1)$ term while the other terms $-k2(0)$, $-k2(-2)$, $-k2(+2)$, and $-k2(-1)$ are all 1's. The $-k2(+1)$ term energized as a 0 signifies that $2^2$ is multiplied by a factor of +1.

In. FIG. 4, the logic block 245 for BITS 2, 3, 4 has inputs $+a2$, $+a3$, and $+a4$ with the values 1, 0, and 0, respectively, so that the $-k3(-2)$ output is a 0 while all other outputs are 1's. The 0 energization of the $-k3(-2)$ term signifies that the $2^4$ term is multiplied by a factor of −2.

In FIG. 4, the logic block 245 for BITS 0, 1, 2 has the $\pm a0$, $\pm a1$, $\pm a2$ inputs with the values 0, 1, 1, respectively, so that the output $-k4(+2)$ is energized with a 0 where all other ouputs are 1's. The 0 energization of the $-k4(+2)$ term signifies multiplication of the $2^6$ term by a factor of +2.

Referring to FIGS. 4 and 5, the $+a0$ input is a 0 and the $-a0$ input is a 1. Assuming normal 8-bit byte processing, the signal +NBQ is a 0. Further, since this is not the byte of the operand A multiplier which carries the sign, the +SIER input is a 0 and the −SIER input is a 1. With these inputs, the $-k5(+1)$ output is a 1 and the $-k5(0)$ output is a 0 signifying multiplication of the $2^8$ term by a factor of 0.

In FIG. 6, the multiple gates 222 receive the $-k(1,5)$ control signals and the operand ±B. The control signals are operative to form the five partial sums PS1, PS2, . . . , PS5 which are input to the carry-save adder 226. Those five partial sums are indicated in the following chart.

CHART

| | | |
|---|---|---|
| PS1 | . . . 0 0 0 0 0 0 0 0 | k1(0) |
| PS2 | . . . 0 0 1 1 0 0 1 0 | k2(+1) |
| PS3 | . . . 1 1 0 0 1 1 1 0 | k3(−2) |
| PS4 | . . . 0 0 1 1 0 0 1 0 | k4(+2) |
| PS5 | . . . 0 0 0 0 0 0 0 0 | k5(0) |

In forming the artial sum PS1 the input operand B is multiplied by 0, hence all the inputs are 0. In forming the partial sum PS2, the input operand B is shifted two bits and gated through directly. In forming the partial sum PS3, the complemented input operand −B is shifted left four bits plus an additional bit for the −2 factor. Additionally, a 1 is carried into the lower order bit position which is then propagated into the next higher bit, because, for B equal to 50, the low order bit is already a 1. In forming the PS4 term, the input operand B is shifted left six bits plus an additional bit for the +2 multiplication factor. In forming the PS5 term, the input operand B is shifted left eight bits and multiplied by 0.

The carry-save adder of FIG. 2 receives the five partial sums PS1, PS2, . . . , PS5 aligned as indicated in the above chart to form the partial results R1 and R2. R1 and R2 are then added in adder 18 of FIG. 2, as any conventional addition of two operands, to form the final sum qual to decimal 5,000 in binary form.

While the invention has been particularly shown and described with reference to preferred embodiments thereof, it will be understood by those skilled in the art that the foregoing and other changes in form and details may be made therein without departing from the spirit and scope of the invention.

We claim:

1. In a data processing system wherein an operand B is multiplied by an operand A where A includes the non-overlapping bytes A$i$, to form the product P an apparatus for performing the operation $(Ai)(B) + C(i-1) = R1(i), R2(i)$ comprising a recoder for recoding the bytes Ai into an $x$-bit code, multiple gate means for forming $x$ partial sums of said operand B under control of said $x$-bit code, a multiple input adder for receiving the $x$ partial sums from said multiple gates for concurrently adding said partial sums and $C(i-1)$ to form the partial results $R1(i)$, $R2(i)$.

2. The data processing system of claim 1 further including an adder for adding the resultants $R1(i)$ and $R2(i)$ to form a partial product $Ci$.

3. The data processing system of claim 1 wherein said bytes A$i$ are each eight bits, wherein $x$ is 5 and wherein said recoder is an 8-to-5 recoder.

4. The data processing system of claim 3 wherein said eight bits of said operand bytes A$i$ represent the binary values $2^0$, $2^1$, . . . , $2^7$ and wherein said recoder forms the recoded outputs in multiples of $2^0$, $2^2$, $2^4$, $2^6$, and $2^8$.

5. The data processing system of claim 4 wherein said recoded outputs are further multiplied by the five factors 0, ±1, or ±2.

6. A data processing system where an operand B is multiplied by an operand A to form the product P where P includes the bytes P1, P2, . . . , P8 where A includes the non-overlapping A$i$ bytes A1, A2, A3 and A4 each having $y$ bits, the apparatus comprising, a recoder for recoding each byte A$i$ to form $x$ control signals where $x$ equals the largest whole number in $(y/2+1)$, multiple gate means for forming $x$ partial sums of said operand B in response to said control signals for each of said bytes A$i$, a multiple input adder for receiving the outputs from said multiple gates and for receiving a partial product $C(i-1)$ to perform operations $(Ai)(B)+C(i-1)=R1(i), R2(i)$ for all values of $i$ equal to 1, 2, 3 and 4 and wherein the value of C(0) is 0, a two input adder for adding the partial results $R1(i)$ and $R2(i)$ to form the partial product C$i$ for all values of $i$ equal to 1, 2, 3 and 4 where P1 is the lowest order byte of C1 and for adding the partial product C4 to bytes from the partial product C3 to form the bytes P4, P5, . . . , P8, means including a byte adder for adding the lowest order byte of the partial product C$i$ to the next lowest order byte of the partial product $C(i-1)$ to form the bytes P$i$ for $i$ equal to 2 and 3 whereby P2 and P3 are formed.

7. The system of claim 6 wherein $x$ equals five and wherein said bytes are eight binary bits, whereby said recoder recodes from 8-to-5 to form the weights $2^0$, $2^2$, $2^4$, $2^6$, $2^8$ and wherein each weight is additionally multiplied by one of the five values, 0, ±1, ±2.

8. The system of claim 7 wherein the $2^0$, $2^2$, $2^4$, $2^6$, $2^8$ multiplications are achieved by shifting B by 0 bits, 2 bits, 4 bits, 6 bits and 8 bits, respectively, and where each of those shifted values of B are further multiplied by 0, +1, −1, +2 or −2 by making the shifted value of B equal to all 0's, by using the shifted value of B, by complementing the shifted value of B and inserting a carry-in in the low-order bit position, by shifting the shifted value of B one additional bit, and by complementing and shifting one additional bit the shifted value of B and inserting a carry-in in the low order bit position, respectively.

9. A data processing system where an operand B is multiplied by an operand A where A includes the four non-overlapping A$i$ bytes A1, A2, A3 and A4, the improvement comprising, a recoder for recoding each byte A$i$ to form five control signals, multiple gate means for forming five partial sums of said operand B in response to said five control signals for each of said bytes A$i$, a multiple input adder for receiving the outputs from said multiple gates and for receiving a partial product $C(i-1)$ to perform operations $(Ai)(B)+C(i-1)=R1(i),R2(i)$ for all values of $i$ equal to 1, 2, 3 and 4 and wherein the value for $i$=1 of C0 is 0, a two input adder for adding the partial results R1$(i)$ and R2$(i)$ to form the partial product C$i$ for all values of $i$ equal to 1, 2, 3 and 4, first store means for storing the partial product C$i$ for all values of $i$ equal to 1, 2, 3 and 4, means for connecting the three bytes C$i$(3), C$i$(2) and C$i$(1), for each partial product C$i$ for $i$ equal to 1, 2, and 3, from said first store means to said multiple input adder, second store means for storing the bytes C$i$(5) and C$i$(4) received from said first store means where the byte C1(5) is the low-order product byte P1, byte adder means connected to receive bytes from said first and second store means for adding the bytes C1(4) and C2(5) and the bytes C2(4) and C3(5) to form the product bytes P2 and P3, respectively, means connecting the partial product C4 and the bytes C3(4), C3(3), C3(2) and C3(1) to said two input adder for addition to form the high-order product bytes P4, P5, P6, P7 and P8 whereby the product AB=P is formed with P equal to P1, P2, . . . , P8.

* * * * *

UNITED STATES PATENT OFFICE
CERTIFICATE OF CORRECTION

Patent No. 3,840,727 Dated October 8, 1974

Inventor(s) Gene M. Amdahl, Michael R. Clements & Lyle C. Topham.

It is certified that error appears in the above-identified patent and that said Letters Patent are hereby corrected as shown below:

IN THE CLAIMS:

Claim 4, column 10, line 56, cancel "operand".

Claim 9, column 12, lines 3 and 4, cancel "improvement" and substitute therefor --apparatus--.

Signed and sealed this 14th day of January 1975.

(SEAL)
Attest:

McCOY M. GIBSON JR.
Attesting Officer

C. MARSHALL DANN
Commissioner of Patents